(12) United States Patent
Landry

(10) Patent No.: US 7,909,350 B1
(45) Date of Patent: Mar. 22, 2011

(54) METHOD AND APPARATUS FOR ADJUSTABLE TRAILER HITCH

(76) Inventor: William M. Landry, Theodore, AL (US)

( * ) Notice: Subject to any disclaimer, the term of this patent is extended or adjusted under 35 U.S.C. 154(b) by 18 days.

(21) Appl. No.: 12/590,268

(22) Filed: Nov. 6, 2009

Related U.S. Application Data

(60) Provisional application No. 61/214,177, filed on Apr. 21, 2009.

(51) Int. Cl.
*B60D 1/40* (2006.01)
*B60D 1/54* (2006.01)

(52) U.S. Cl. ............ 280/479.2; 280/491.3; 280/478.1; 280/479.3; 280/456.1; 280/491.1; 280/477; 280/511; 280/416.1

(58) Field of Classification Search .......... 280/491.3, 280/478.1, 479.3, 456.1, 479.2, 477, 491.1, 280/511, 416.1
See application file for complete search history.

(56) References Cited

U.S. PATENT DOCUMENTS

| | | | |
|---|---|---|---|
| 3,981,517 A | 9/1976 | Crochet, Sr. | |
| 4,944,525 A | 7/1990 | Landry | |
| 4,951,957 A * | 8/1990 | Gullickson | 280/479.2 |
| 5,288,095 A * | 2/1994 | Swindall | 280/479.2 |
| 5,322,315 A * | 6/1994 | Carsten | 280/479.2 |
| 5,547,210 A | 8/1996 | Dugger | |
| 5,727,805 A | 3/1998 | La Roque | |
| 5,806,872 A | 9/1998 | Szczypski | |
| 6,068,281 A * | 5/2000 | Szczypski | 280/479.2 |
| 6,170,852 B1 * | 1/2001 | Kimbrough | 280/479.2 |
| 6,286,852 B1 | 9/2001 | Slatten | |
| 6,729,637 B2 * | 5/2004 | Wolters et al. | 280/491.3 |
| 7,338,062 B1 | 3/2008 | Violette et al. | |
| 7,556,279 B2 * | 7/2009 | Suhling | 280/512 |
| 7,793,967 B2 * | 9/2010 | McConnell | 280/491.1 |
| 7,850,192 B2 * | 12/2010 | Ceccarelli et al. | 280/478.1 |
| 2002/0003342 A1 * | 1/2002 | Slatten | 280/479.3 |
| 2007/0080516 A1 | 4/2007 | Simmons | |
| 2008/0169628 A1 * | 7/2008 | Kerpash | 280/491.3 |
| 2009/0322059 A1 * | 12/2009 | Williams, Jr. | 280/479.3 |

* cited by examiner

*Primary Examiner* — Paul N Dickson
*Assistant Examiner* — Marlon A Arce
(74) *Attorney, Agent, or Firm* — George L. Williamson

(57) ABSTRACT

Method and apparatus for an adjustable trailer hitch which allows the ball to be adjustable laterally and longitudinally so that the tongue of the trailer can be can be more easily attached to the ball of the towing vehicle. A body portion is mounted on a slide-tube for insertion in a receiver-tube wherein the body portion has an interior pocket or space which allows the draw bar having the ball mounting thereon to move laterally inside the pocket along with a plurality of apertures so that the draw bar can be laterally adjusted using the apertures and a first locking pin. The slide-tube also has a longitudinal adjustment slot in it which allows it to slide longitudinally inside the receiver-tube wherein a second locking pin holds the slide-tube in the receiver-tube allowing the entire trailer hitch to be longitudinally adjustable along the longitudinal axis of the towing vehicle.

7 Claims, 2 Drawing Sheets

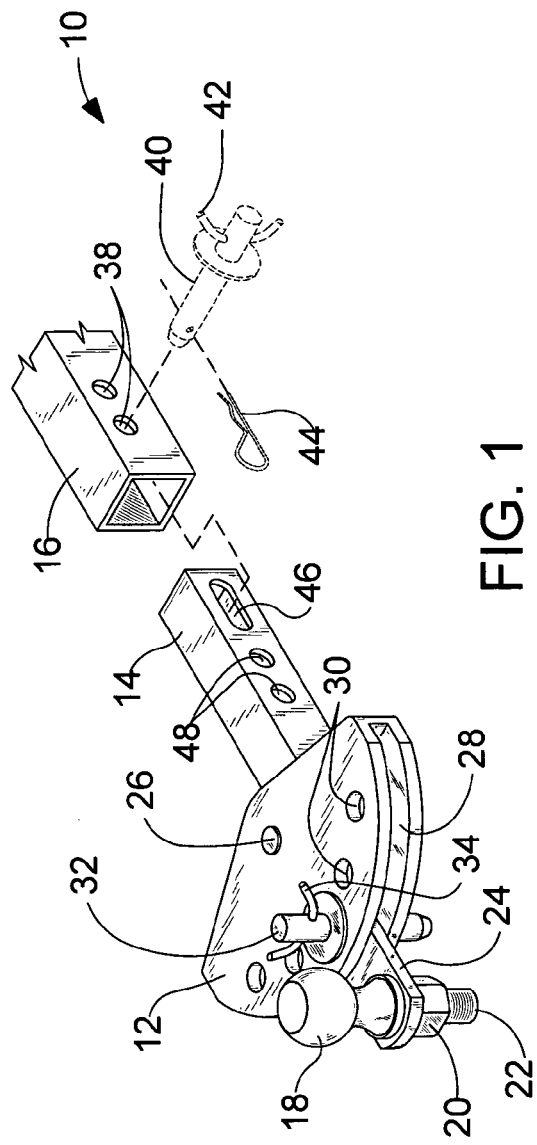
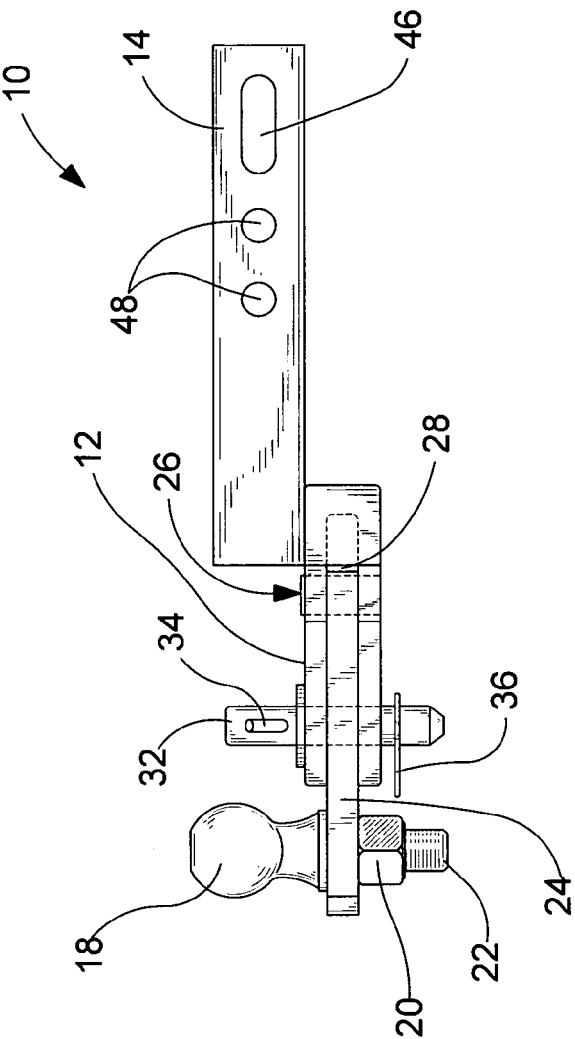
FIG. 1
FIG. 3

METHOD AND APPARATUS FOR ADJUSTABLE TRAILER HITCH

RELATED APPLICATIONS

This application claims benefit of U.S. Provisional Application No. 61/214,177 filed on Apr. 21, 2009.

BACKGROUND OF THE INVENTION

1. Field of the Invention

The present invention relates generally to trailer hitches and, more particularly, is concerned with an adjustable trailer hitch.

2. Description of the Prior Art

Adjustable trailer hitches have been described in the prior art, however, none of the prior art devices disclose the unique features of the present invention.

In U.S. Pat. No. 7,338,062 dated Mar. 4, 2008, Violette, et al., disclosed a swiveling extender tow hitch and method of centering and locking same. In U.S. Patent Application Publication 2007/0080516 dated Apr. 12, 2007, Simmons disclosed a trailer hitch assembly. In U.S. Pat. No. 5,806,872 dated Sep. 15, 1998, Szczypski disclosed a trailer hitch assembly. In U.S. Pat. No. 5,322,315 dated Jun. 21, 1994, Carsten disclosed a towing hitch. In U.S. Pat. No. 4,944,525 dated Jul. 31, 1990, Landry disclosed a self-locking trailer hitch. In U.S. Pat. No. 5,547,210 dated Aug. 20, 1996, Dugger disclosed a trailer hitch. In U.S. Pat. No. 5,727,805 dated Mar. 17, 1998, La Roque disclosed an adjustably extensible trailer hitch assembly. In U.S. Pat. No. 6,286,852 dated Sep. 11, 2001, Slatten disclosed a self-aligning hitch. In U.S. Pat. No. 3,981,517 dated Sep. 21, 1976, Crochet, Sr., disclosed a coupling mechanism adapted to latch an object to an object. While these adjustable hitches may be suitable for the purposes for which they were designed, they would not be as suitable for the purposes of the present invention as hereinafter described.

SUMMARY OF THE PRESENT INVENTION

The present invention discloses an adjustable trailer hitch which allows the ball to be adjustable laterally and longitudinally so that the tongue of the trailer can be can be more easily attached to the towing vehicle. The present invention has a body portion mounted on a slide-tube for insertion in a receiver-tube wherein the body portion has an interior pocket or space which allows the draw bar having the ball mounting thereon to move laterally inside the pocket along with a plurality of apertures so that the draw bar can be laterally adjusted using the apertures and a first locking pin. The slide-tube also has a longitudinal adjustment slot in it which allows it to slide longitudinally inside the receiver-tube wherein a second locking pin holds the slide-tube in the receiver-tube allowing the entire trailer hitch to be longitudinally adjustable along the longitudinal axis of the towing vehicle.

An object of the present invention is to allow the ball of a trailer hitch to be both laterally and longitudinally adjustable on the towing vehicle. A further objective of the present invention is to provide an adjustable trailer hitch which can be easily and relatively inexpensively manufactured. A further object of the present invention is to provide an adjustable trailer hitch which is easy to use.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective view of the present invention.

FIG. 3 is a side elevation view of an alternative embodiment of the present invention.

LIST OF REFERENCE NUMERALS

Figure 2:
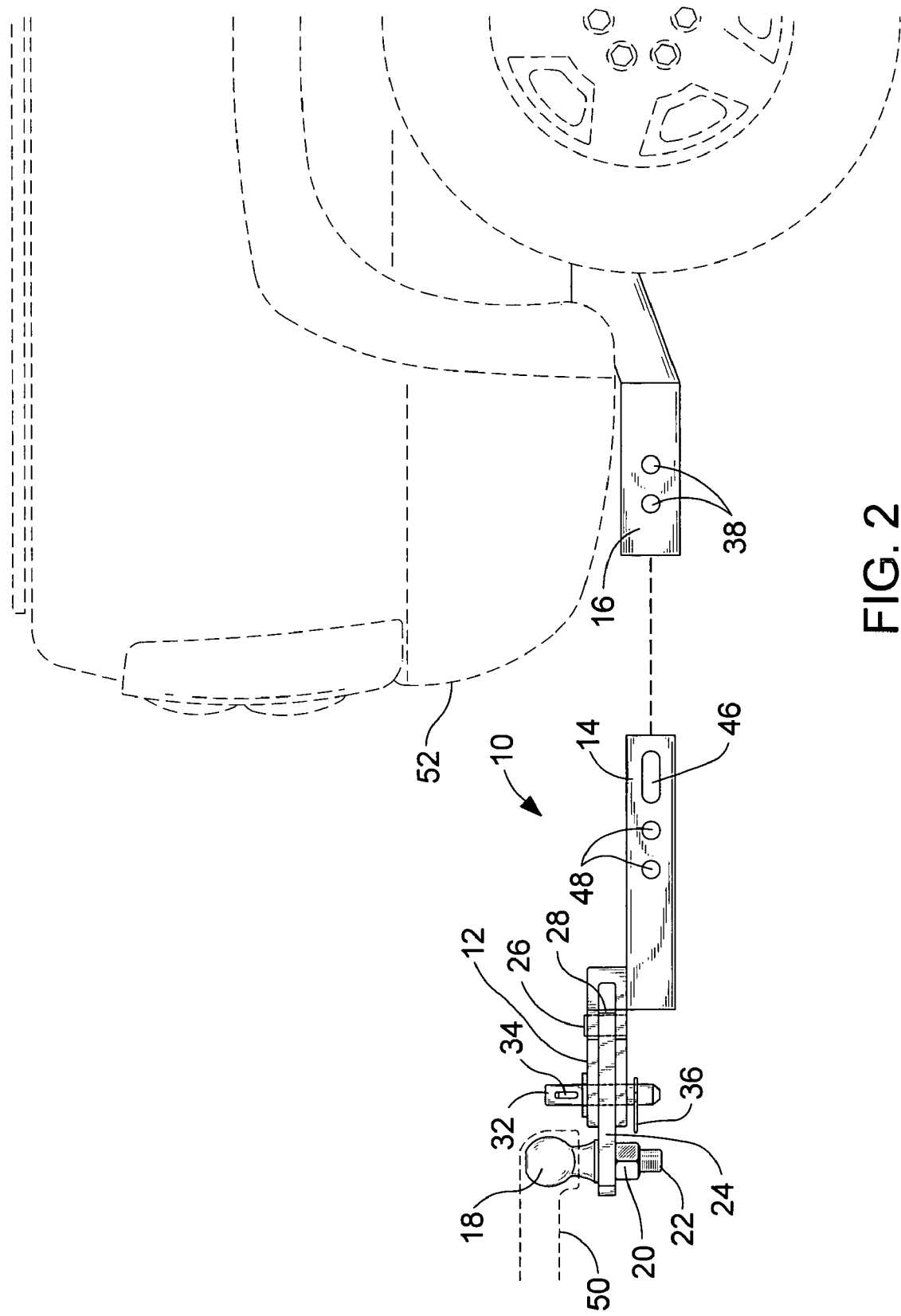
FIG. 2 is a side elevation view of the present invention.

With regard to reference numerals used, the following numbering is used throughout the drawings.

| | |
|---|---|
| 10 | present invention |
| 12 | body |
| 14 | slide tube |
| 16 | receiver tube |
| 18 | ball |
| 20 | nut |
| 22 | threaded end |
| 24 | draw bar |
| 26 | pivot pin |
| 28 | interior pocket |
| 30 | apertures |
| 32 | locking pin |
| 34 | handle |
| 36 | cotter pin |
| 38 | aperture |
| 40 | locking pin |
| 42 | handle |
| 44 | cotter pin |
| 46 | longitudinal adjustment slot |
| 48 | aperture |
| 50 | trailer tongue |
| 52 | towing vehicle |

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 3 illustrate the present invention wherein an adjustable trailer hitch is disclosed.

Turning to FIGS. 1-3, therein is shown the present invention 10 having a body 12 mounted on one end being the rear end of a slide-tube 14 so that the other end of the slide tube can be mounted by insertion into a conventional receiver tube 16 wherein a ball 18 for receiving the tongue 50 of a trailer is attached thereto wherein the ball is attached by a nut 20 mounted on a threaded end 22 so that the ball is securely attached to a draw bar 24. The draw bar 24 is pivotally mounted to a pivot pin 26 which is mounted near the front of the body 12 wherein an interior space or pocket 28 is disposed inside the body 12 and allows the draw bar to move within the interior pocket in a left and right lateral direction to allow the draw bar to be laterally adjustable. The body 12 has a plurality of spaced apart apertures 30 disposed from one side to the other side being approximately three to five in number and wherein a first locking pin 32 having a handle 34 thereon can be inserted through one of the selected apertures 30 and through the mating aperture within the draw bar 24 so that the draw bar can be locked in one of several user selected positions. Cotter pin 36 can be placed on locking pin 32 in order to secure it in position. A plurality of apertures 38 are disposed in receiver tube 16 for receiving a second locking pin 40 having handle 42 thereon and mating cotter pin 44 thereon for securing a second locking pin in place on the selected aperture on receiver tube 16. It can be seen that the slide tube 14 has a longitudinally elongated adjustment slot 46 thereon and a plurality of apertures 48 thereon so that the slide tube can be inserted into the receiver tube 16 so that the locking pin 40 is inserted through the longitudinal adjustment slot 46 to allow the trailer hitch ball 18 to be longitudinally adjustable on the towing vehicle. In operation, after the slide tube 14 having pin 40 inserted through longitudinal adjustment slot 46 is positioned in a user selected position relative to the trailer and towing vehicle, the pin 40 is removed and reinserted in aperture 48 in order to secure a trailer hitch in a preferred user selected position. After the ball 18 is connected to the tongue 50 of the trailer, the towing vehicle 52 is moved to the front or rear so that the locking pin 40 can be secured in the appropriate aperture 48 of the slide tube. Furthermore, the draw bar 24 can be laterally operated with the locking pin 32 in any one of the apertures 30 of the body 12 of the trailer hitch according to the preference of the operator so as to make it easy to connect the tongue of the trailer to the ball 18 on the towing vehicle 52. It is expected that normally the draw bar 24 will be positioned so that it is aligned with the central aperture 30 of the body 12 which causes the longitudinal axis of the draw bar and slide tube 14 to be aligned. In summary, the operation of the present invention could be summarized as follows: positioning the vehicle so that the ball is within a few inches from the tongue of the trailer and aligning the slot and the aperture on the receiving tube and placing the second locking pin in the slot and the aperture in the receiving tube; sliding the drawbar longitudinally and moving the ball laterally so that the tongue of the trailer is mounted onto the ball; aligning the user selected second aperture and the third aperture and placing the first locking pin in the second and third apertures; and, removing the second locking pin from the slot and the aperture in the receiving tube and then moving the vehicle to the rear so as to align the user selected first aperture and the aperture in the receiving tube and re-placing the second locking pin in the user selected first aperture and the aperture in the receiving tube so that the trailer is connected to the vehicle.

FIG. 3 shows an alternative embodiment of the present invention 10 wherein the body 12 is disposed underneath slide tube 14 being similar to the embodiment shown in FIGS. 1-2 in other respects. Note that by rotating the body 12, 180 degrees in the receiver tube 16 and turning the ball 18 over with respect to the body, i.e., inserting the ball on the opposite of the body, that the elevation of the ball with respect to the ground can be changed 3-4 inches.

I claim:

1. An apparatus for an adjustable trailer hitch for connecting a trailer to a vehicle, the vehicle having a receiving tube mounted thereon, the receiving tube having at least one aperture extending horizontally therethrough, comprising:
    a) a slide tube having front and rear end portions and upper and lower surfaces, wherein said front end portion of said slide tube is slidably insertable into and removable from the receiving tube, said slide tube having at least one first aperture extending horizontally therethrough, said slide tube having a slot extending horizontally therethrough, wherein said slot is longitudinally elongated;
    b) a body having front and rear end portions, upper and lower surfaces, and first and second side portions, wherein said lower front is disposed on said upper, rear of said slide tube, said body having an interior space therein, wherein said interior space is formed between and bounded by said upper and lower surfaces, said body having a plurality of second apertures extending vertically therethrough, wherein said second apertures pass entirely through said upper and lower surfaces and are disposed adjacent said rear portion of said body in a spaced apart relationship between said first and second side portions;
    c) a pivot pin being generally vertically disposed in said body;
    d) a draw bar having front and rear end portions being disposed in said interior space of said body, said front portion being connected to said pivot pin, said rear portion extending from said rear of said interior space an effective distance so that a ball can be mounted thereon, said draw bar having a third aperture extending vertically therethrough;
    e) wherein said draw bar is laterally pivotable on said pivot pin between said first and said second side portions of said body so that the ball can be moved laterally back and forth between said first and second side portions of said body, wherein said third aperture is configured to align with said plurality of second apertures as said draw bar pivots laterally between said first and second side portions of said body;
    f) a first locking pin being removably inserted into said plurality of second apertures and said third aperture so that the draw bar can be locked into a user selected aperture of said plurality of second apertures as said draw bar pivots laterally between said first and second side portions of said body; and,
    g) a second locking pin being removably insertable into said first aperture of said slide tube and the aperture of the receiving tube so that the slide tube can be locked into a user selected first aperture of said slide tube so that the ball on said draw bar can be moved back and forth in the longitudinal direction relative to the vehicle.

2. The apparatus of claim 1, wherein said upper front portion of said body is disposed on said lower, rear portion of said slide tube.

3. The apparatus of claim 1, wherein the number of second apertures ranges from three to five.

4. A method for making an adjustable trailer hitch for connecting a trailer to a vehicle, the vehicle having a receiving tube mounted thereon, the receiving tube having at least one aperture extending horizontally therethrough, comprising the steps of:
    a) providing a slide tube having front and rear end portions and upper and lower surfaces, wherein the front end portion of the slide tube is slidably insertable into and removable from the receiving tube, the slide tube having at least one first aperture extending horizontally therethrough, the slide tube having a slot extending horizontally therethrough, wherein the slot is longitudinally elongated;

b) providing a body having front and rear end portions, upper and lower surfaces, and first and second side portions, wherein the lower front is disposed on the upper, rear of the slide tube, the body having an interior space therein, wherein the interior space is formed between and bounded by the upper and lower surfaces, the body having a plurality of second apertures extending vertically therethrough, wherein the second apertures pass entirely through the upper and lower surfaces and are disposed adjacent the rear portion of the body in a spaced apart relationship between the first and second side portions;

c) providing a pivot pin being generally vertically disposed in the body;

d) providing a draw bar having front and rear end portions being disposed in the interior space of the body, the front portion being connected to the pivot pin, the rear portion extending from the rear of the interior space an effective distance so that a ball can be mounted thereon, the draw bar having a third aperture extending vertically therethrough;

e) wherein the draw bar is laterally pivotable on the pivot pin between the first and the second side portions of the body so that the ball can be moved laterally back and forth between the first and second side portions of the body, wherein the third aperture is configured to align with the plurality of second apertures as the draw bar pivots laterally between the first and second side portions of the body;

f) providing a first locking pin being removably inserted into the plurality of second apertures and the third aperture so that the draw bar can be locked into a user selected aperture of the plurality of second apertures as the draw bar pivots laterally between the first and second side portions of the body; and, g) providing a second locking pin being removably insertable into the first aperture of the slide tube and the aperture of the receiving tube so that the slide tube can be locked into a user selected first aperture of the slide tube so that the ball on the draw bar can be moved back and forth in the longitudinal direction relative to the vehicle.

5. The method of claim 4 wherein the upper front portion of the body is disposed on the lower, rear portion of the slide tube.

6. The method of claim 4, wherein the number of second apertures ranges from three to five.

7. A method of using an adjustable trailer hitch for connecting a trailer to a vehicle, the vehicle having a receiving tube mounted thereon, the receiving tube having at least one aperture extending horizontally therethrough, comprising the steps of:

a) providing a slide tube having front and rear end portions and upper and lower surfaces, wherein the front end portion of the slide tube is slidably insertable into and removable from the receiving tube, the slide tube having at least one first aperture extending horizontally therethrough, the slide tube having a slot extending horizontally therethrough, wherein the slot is longitudinally elongated;

b) providing a body having front and rear end portions, upper and lower surfaces, and first and second side portions, wherein the lower front is disposed on the upper, rear of the slide tube, the body having an interior space therein, wherein the interior space is formed between and bounded by the upper and lower surfaces, the body having a plurality of second apertures extending vertically therethrough, wherein the second apertures pass entirely through the upper and lower surfaces and are disposed adjacent the rear portion of the body in a spaced apart relationship between the first and second side portions;

c) providing a pivot pin being generally vertically disposed in the body;

d) providing a draw bar having front and rear end portions being disposed in the interior space of the body, the front portion being connected to the pivot pin, the rear portion extending from the rear of the interior space an effective distance so that a ball can be mounted thereon, the draw bar having a third aperture extending vertically therethrough;

e) wherein the draw bar is laterally pivotable on the pivot pin between the first and the second side portions of the body so that the ball can be moved laterally back and forth between the first and second side portions of the body, wherein the third aperture is configured to align with the plurality of second apertures as the draw bar pivots laterally between the first and second side portions of the body;

f) providing a first locking pin being removably inserted into the plurality of second apertures and the third aperture so that the draw bar can be locked into a user selected aperture of the plurality of second apertures as the draw bar pivots laterally between the first and second side portions of the body;

g) providing a second locking pin being removably insertable into the first aperture of the slide tube and the aperture of the receiving tube so that the slide tube can be locked into a user selected first aperture of the slide tube so that the ball on the draw bar can be moved back and forth in the longitudinal direction relative to the vehicle;

h) positioning the vehicle so that the ball is within a few inches from the tongue of the trailer and aligning the slot and the aperture on the receiving tube and placing the second locking pin in the slot and the aperture in the receiving tube;

i) sliding the drawbar longitudinally and moving the ball laterally so that the tongue of the trailer is mounted onto the ball;

j) aligning the user selected second aperture and the third aperture and placing the first locking pin in the second and third apertures; and, k) removing the second locking pin from the slot and the aperture in the receiving tube and then moving the vehicle to the rear so as to align the user selected first aperture and the aperture in the receiving tube and replacing the second locking pin in the user selected first aperture and the aperture in the receiving tube so that the trailer is connected to the vehicle.

\* \* \* \* \*